(12) United States Patent
Hughes et al.

(10) Patent No.: US 8,739,861 B2
(45) Date of Patent: Jun. 3, 2014

(54) ELECTRICAL WIRING FOR DRILL PIPE, CASING, AND TUBING

(75) Inventors: William James Hughes, Highlands Ranch, CO (US); Bryan Lane, Houston, TX (US); Gary Marshall Briggs, Houston, TX (US)

(73) Assignee: Sunstone Technologies, LLC, Oklahoma City, OK (US)

( * ) Notice: Subject to any disclaimer, the term of this patent is extended or adjusted under 35 U.S.C. 154(b) by 267 days.

(21) Appl. No.: 13/178,446

(22) Filed: Jul. 7, 2011

(65) Prior Publication Data

US 2012/0012301 A1   Jan. 19, 2012

Related U.S. Application Data

(60) Provisional application No. 61/365,120, filed on Jul. 16, 2010.

(51) Int. Cl.
*E21B 29/02* (2006.01)

(52) U.S. Cl.
USPC ....... 166/65.1; 166/77.51; 166/378; 166/380; 285/330

(58) Field of Classification Search
USPC ...................................... 166/77.51
See application file for complete search history.

(56) References Cited

U.S. PATENT DOCUMENTS

| | | |
|---|---|---|
| 1,547,759 A | 5/1921 | Journeay |
| 1,781,091 A | 7/1924 | Wilson |
| 2,000,716 A | 5/1935 | Polk |
| 2,089,168 A | 8/1937 | Brown |
| 2,296,198 A | 9/1938 | Boynton |
| 2,314,897 A | 4/1941 | Purinton |
| 2,750,569 A | 6/1956 | Moon |
| 3,249,377 A | 5/1966 | Weasler |
| 3,463,228 A | 8/1969 | Hearn |
| 3,863,959 A | 2/1975 | Blaschke |
| 4,099,745 A | 7/1978 | Cobbs |
| 4,375,310 A | 3/1983 | Robinson et al. |
| 4,683,944 A * | 8/1987 | Curlett .................. 166/65.1 |

(Continued)

FOREIGN PATENT DOCUMENTS

| | | |
|---|---|---|
| GB | 2233415 | 1/1991 |
| WO | 2005026494 A1 | 3/2005 |
| WO | 2009148921 A1 | 12/2009 |

OTHER PUBLICATIONS

PCT search report and written opinion dated Dec. 5, 2011 regarding International application No. PCT/IB11/53036, filed Jul. 7, 2011, applicant Sunstone Technologies, LLC (10 Pages).

(Continued)

*Primary Examiner* — Jennifer H Gay
*Assistant Examiner* — Caroline Butcher
(74) *Attorney, Agent, or Firm* — Sheridan Ross P.C.

(57) ABSTRACT

An apparatus includes a first pin and a second pin. The first pin has a first joint section. The first joint section has first holes extending a length of the first joint section and terminating at a first preload face. The second pin has a second joint section. The second joint section has second holes extending a length of the first joint section and terminating at a second preload face. The second joint section is adapted to receive the first joint section and the first holes match the second holes when the first pin and the second pin are mated.

24 Claims, 12 Drawing Sheets

(56) References Cited

U.S. PATENT DOCUMENTS

| | | | |
|---|---|---|---|
| 4,792,320 A | 12/1988 | Nickel | |
| 4,862,976 A | 9/1989 | Meek | |
| 5,048,871 A | 9/1991 | Pfeiffer et al. | |
| 5,238,073 A | 8/1993 | Rear | |
| 5,269,572 A | 12/1993 | Mefferd | |
| 5,474,334 A | 12/1995 | Eppink | |
| 5,609,440 A | 3/1997 | Roche | |
| 5,685,381 A | 11/1997 | Kloppers et al. | |
| 5,829,797 A | 11/1998 | Yamamoto | |
| 5,950,744 A | 9/1999 | Hughes | |
| 6,123,561 A | 9/2000 | Turner et al. | |
| 6,148,935 A | 11/2000 | Wentworth et al. | |
| 6,484,801 B2 | 11/2002 | Brewer et al. | |
| 6,543,554 B2 | 4/2003 | Smith | |
| 6,547,479 B2 | 4/2003 | Dowling, Jr. et al. | |
| 6,572,152 B2 | 6/2003 | Dopf et al. | |
| 6,581,980 B1 | 6/2003 | DeLange et al. | |
| 6,634,427 B1 * | 10/2003 | Turner et al. | 166/298 |
| 6,666,274 B2 | 12/2003 | Hughes | |
| 6,761,574 B1 | 7/2004 | Song et al. | |
| 7,104,345 B2 | 9/2006 | Eppink | |
| 7,226,090 B2 | 6/2007 | Hughes | |
| 7,390,032 B2 | 6/2008 | Hughes | |
| 7,493,960 B2 | 2/2009 | Leising et al. | |
| 7,494,159 B2 | 2/2009 | Sugino et al. | |
| 7,559,583 B2 | 7/2009 | Stoetzer | |
| 7,581,602 B2 | 9/2009 | Lorger et al. | |
| 7,762,824 B2 | 7/2010 | Smith | |
| 7,777,644 B2 | 8/2010 | Madhavan et al. | |
| 7,823,931 B2 | 11/2010 | Hamamoto et al. | |
| 2005/0022999 A1 * | 2/2005 | Hughes | 166/380 |
| 2008/0230218 A1 | 9/2008 | Hall et al. | |
| 2008/0230277 A1 | 9/2008 | Hall et al. | |
| 2009/0200798 A1 | 8/2009 | Hamamoto et al. | |
| 2010/0116509 A1 * | 5/2010 | Robert et al. | 166/378 |
| 2011/0180273 A1 | 7/2011 | Hughes et al. | |

OTHER PUBLICATIONS

International Search Report for International (PCT) Patent Application No. PCT/IB11/50329 mailed Jun. 21, 2011, 4 pages.

Written Opinion for International (PCT) Patent Application No. PCT/IB11/50329 mailed Jun. 21, 2011, 7 pages.

International Preliminary Report on Patentability for International (PCT) Patent Application No. PCT/IB11/50329 mailed Jul. 31, 2012, 8 pages.

International Preliminary Report on Patentability for International (PCT) Patent Application No. PCT/IB11/53036 mailed Jan. 22, 2013, 8 pages.

Official Action for New Zealand Patent Application No. 601327 dated Apr. 26, 2013, 2 pages.

Official Action for New Zealand Patent Application No. 605385 dated Aug. 16, 2013, 3 pages.

Official Action for U.S. Appl. No. 12/695,569 mailed Apr. 20, 2012, 6 pages.

Official Action for U.S. Appl. No. 12/695,569 mailed Jun. 20, 2012, 10 pages.

Official Action for U.S. Appl. No. 12/695,569 mailed Jan. 10, 2013, 8 pages.

* cited by examiner

ELECTRICAL WIRING FOR DRILL PIPE, CASING, AND TUBING

CROSS REFERENCE TO RELATED APPLICATIONS

The present application is related to pending patent application entitled "Tapered Spline Connection for Drill Pipe, Casing, and Tubing," U.S. patent application Ser. No. 12/695,569 filed Jan. 28,2010, assigned to the same assignee and incorporated herein by reference.

The present application is related to, and claims the benefit of priority of expired provisional U.S. Patent Application Ser. No. 61/1365,120, filed Jul. 16, 2010, entitled "Electrical Wiring for Drill Pipe, Casing, and Tubing," which is incorporated herein by reference.

BACKGROUND

1. Field

The present disclosure generally relates to drill pipe, casing, and tubing used to locate and produce hydrocarbons in a subterranean environment and more specifically, to electrical wiring in joining sections of at least one of drill pipe, casing, and tubing.

2. Description of the Related Art

Large portions of hydrocarbon location and production activities involve drilling, pumping, and conduit installation beneath the surface of the earth. In addition, drilling, pumping and conduit installation operations may include water location and distribution. Drilling, pumping, and conduit installation operations may include sewage processing and distribution. Drilling, pumping, and conduit installation activities often use lengths of pipes. These pipes may be joined together in a variety of different manners. When pipes are joined, there are several considerations. For example, it may be desirable to provide electrical wiring between the lengths of pipes. Electrical wiring may provide signal transmission and/or supply of power to and from opposite ends of adjoined lengths of pipe.

Additionally, certain industry standards regarding the diameters of pipe sections exist today. For example, standards exist about the diameters of the inside of pipes. These standards may maintain expected results for a capacity for flow through a string of joined pipes. Standards also exist about the outer diameter of pipes. These standards may maintain expectancies of certain pipes to fit within certain clearances. Thus, there may be limits on the sizes and thicknesses of materials used in the joint sections of the pipes. The limits on the sizes affect incorporation of electrical wiring into joint sections of the pipes.

Accordingly, a need exists for a method and apparatus that takes into account one or more of the issues discussed above, as well as possibly other issues.

SUMMARY

According to one embodiment of the present disclosure, an apparatus includes a first pin and a second pin. The first pin has a first joint section. The first joint section has first holes extending a length of the first joint section and terminating at a first preload face. The second pin has a second joint section. The second joint section has second holes extending a length of the first joint section and terminating at a second preload face. The second joint section is adapted to receive the first joint section and the first holes match the second holes when the first pin and the second pin are mated.

In another embodiment of the present disclosure, an apparatus includes a pin, wires, spacers, and a layer of material. The pin extends along an axis having a face near an end of the pin. A first portion of each of the wires runs along an exterior surface of the pin in the direction of the axis. A second portion of each of the wires is inside the pin extending towards the end of the pin. The spacers are positioned along the exterior surface of the pin. The spacers separate wires in the wires for the first portion of the wires. The layer of material covers the spacers and the wires.

In yet another embodiment of the present disclosure, a pair of pins includes a male pin, a female pin, first wires, second wires, plug type connectors, and socket type connectors. The male pin has first joint section. The first joint section has first holes extending a length of the first joint section and terminating at a first preload face. The first wires run along an exterior surface of the male pin. A first wire in the first wires enters a first hole in the first joint section at a first angle relative to the exterior surface of the male pin. The first angle is an acute angle having a value selected from a range of values from about one degree to about five degrees. A plug type connector in the plug type connectors is connected to the first wire. The plug type connector extends from the first preload face. The female pin has a second joint section. The second joint section has second holes extending a length of the first joint section and terminating at a second preload face. The second joint section is adapted to receive the first joint section and the first holes match the second holes when the male pin and the female pin are mated. The second wires run along an exterior surface of the female pin. A second wire in the second wires enters a second hole in the second joint section at a second angle relative to the exterior surface of the female pin. The second angle is an acute angle having a value selected from a range of values from about one degree to about five degrees. A socket type connector in the socket type connectors is connected to the second wire. The socket type connector is positioned within the second hole and terminates at the second preload face. The socket type connector is adapted to receive one of the plug type connectors when the male pin and the female pin are mated.

BRIEF DESCRIPTION OF THE SEVERAL VIEWS OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION

Figure 1:
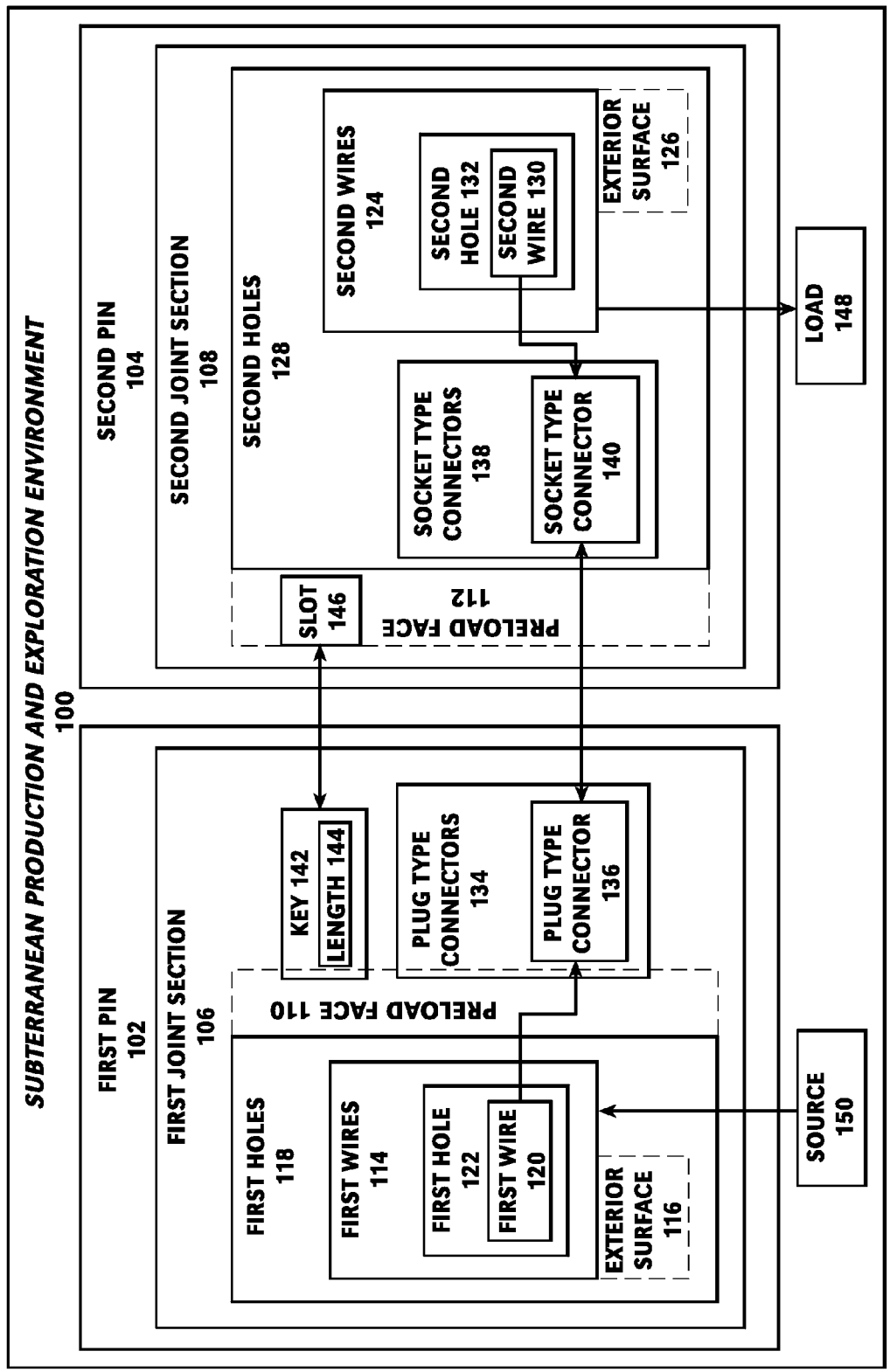
FIG. 1 is a block diagram of a subterranean production and exploration environment in accordance with an illustrative embodiment.

The different illustrative embodiments recognize and take into account a number of different considerations. For example, the different illustrative embodiments recognize that it may be desirable to have electrical wiring supplied to components in a borehole. For example, electrical wiring may transfer signals to and from sensing devices in a borehole. In another example, electrical wiring could supply electrical power to devices in a borehole. For example, an electrical motor or a pump located in a borehole may require electrical power.

The different illustrative embodiments recognize and take into account that one solution may involve running electrical wiring down the borehole independently of any pipes or tubing in the borehole. The different illustrative embodiments recognize that another solution may involve electrical wiring running down the outside of a string of pipes or tubing.

However, the different illustrative embodiments recognize that loose wiring in a borehole may become tangled or intertwined with piping inserted and removed from the borehole. Such tangling or intertwining may result in the breaking or shorting of the electrical wiring. Additionally, exposure of the electrical wiring in the borehole may cause corrosion of connections in the electrical wiring.

The different illustrative embodiments recognize that running electrical wiring down the outside may be difficult for long strings of pipes. For example, keeping the electrical wiring orientated against the string may become difficult as numerous pipes are inserted into a borehole. In other examples, connecting wires running along a pipe may take additional time beyond connecting the pipe with another pipe in the string.

Thus, the illustrative embodiments provide an apparatus for electrical wiring. The apparatus includes a first pin and a second pin. The first pin has a first joint section. The first joint section has first holes extending a length of the first joint section and terminating at a first preload face. The second pin has a second joint section. The second joint section has second holes extending a length of the first joint section and terminating at a second preload face. The second joint section is adapted to receive the first joint section and the first holes match the second holes when the first pin and the second pin are mated.

As used herein "pin" or "pins" is/are cylindrical components that may or may not have a hollow interior. Additionally, the use of the term "pin" or "pins" is intended to include, without limitation, drill pipe, casing, tubing, production tubing, liners, and/or any other cylindrical device suitable for use in boreholes for the production of hydrocarbons. For example, a pin may be a length of a pipe extending from an end of the pipe. The pin may join the pipe with a pin of another pipe. In other example, a pin may be an end of a male pipe to join the male pipe with a box end of a female pipe. As used herein, holes may be channels, tunnels, passages, conduits, or paths through a material configured to allow passage of one or more wires. Holes may have any number of cross sectional shapes. For example, holes may have a number of cross sectional shapes, such as by way of illustrative example, round, square, rectangular, octagonal, hexagonal, and triangular.

With reference now to the figures, and particularly, with reference to FIG. 1, a block diagram of a subterranean production and exploration environment is depicted in accordance with an illustrative embodiment. In these illustrative examples, subterranean production and exploration environment 100 is an environment where illustrative embodiments of the present disclosure may be implemented. For example, without limitation, illustrative embodiments may be implemented in subterranean production and exploration environment 100 for the purpose of drilling, pumping, and conduit installation operations in support of hydrocarbon location and production, water location and distribution, sewage processing and distribution, installation of electrical power transmission lines, and installation of telecommunication industry transmission lines. Subterranean production and exploration environment 100 may include, for example, without limitation, onshore, off shore, and deep sea production and exploration.

In this depicted example, subterranean production and exploration environment 100 includes first pin 102 and second pin 104. First pin 102 has first joint section 106 while second pin 104 has second joint section 108. First joint section 106 and second joint section 108 are portions of first pin 102 and second pin 104, respectively. First joint section 106 and second joint section 108 join first pin 102 and second pin 104 together. For example, first pin 102 and second pin 104 may be mated by moving first joint section 106 and second joint section 108 together. First joint section 106 and/or second joint section 108 may be a tool joint.

In these examples, first pin 102 and second pin 104 are mated by moving preload face 110 of first joint section 106 and preload face 112 of second joint section 108 together. As used herein, preload, when referring to a joint connection, refers to the force in a tightened joint connection prior to using the joint connection for its primary function. Preload is a compressive force resulting from two or more surface pairs being forced together during the assembly of a connection. The surfaces in compression can be tightened by any mechanical forces up to the yield strength of the surfaces in contact. Thus, preload face 110 and preload face 112 are opposing surfaces of first pin 102 and second pin 104 that are pressed against each other when first pin 102 and second pin 104 are mated.

In this illustrative example, first wires 114 run along first pin 102. For example, a portion of each wire in first wires 114 may run in an axial direction along exterior surface 116 of first pin 102. As used herein, an axial direction when referring to cylindrically shaped objects, means a direction substantially parallel to the center axis of the cylindrically shaped object. First wires 114 enter holes in first holes 118 in first joint section 106. First holes 118 are openings formed in first joint section 106 that extend in an axial direction from preload face 110. For example, first wire 120 in first wires 114 enters first hole 122 in first holes 118. The other wires in first wires 114 may enter other holes in first holes 118.

Similarly, second wires 124 run along second pin 104. For example, a portion of each wire in second wires 124 may run in an axial direction along exterior surface 126 of second pin 104. Second wires 124 enter holes in second holes 128 in second joint section 108. Second holes 128 are openings formed in second joint section 108 that extend in an axial direction from preload face 112. For example, second wire 130 in second wires 124 enters second hole 132 in second holes 128. The other wires in second wires 124 may enter other holes in second holes 128.

First wires 114 are associated with plug type connectors 134. A first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of, and/or an extension of, the second component.

Plug type connectors 134 are electrical connections that protrude from preload face 110. In one example, first wires 114 may protrude from preload face 110 to form plug type connectors 134. In another example, first wires 114 connect to plug type connectors 134. For example, first wire 120 in first wires 114 connects to plug type connector 136 in plug type connectors 134. The other wires in first wires 114 connect to other plug type connectors in plug type connectors 134.

Similarly, second wires 124 are associated with socket type connectors 138. Socket type connectors 138 are electrical connections that extend from preload face 112 into second joint section 108. For example, socket type connectors 138 may have holes adapted to receive plug type connectors in plug type connectors 134. Plug type connectors in plug type connectors 134 may be inserted into socket type connectors in socket type connectors 138. Plug type connectors 134 and socket type connectors 138 when joined provide electrical connections between first wires 114 and second wires 124.

In one example, second wires 124 terminate at preload face 112 to form plug type connectors 134. In another example, second wires 124 connect to socket type connectors 138. For example, second wire 130 in second wires 124 connects to socket type connector 140 in socket type connectors 138. The other wires in second wires 124 connect to other socket type connectors in socket type connectors 138.

First joint section 106 also includes key 142. Key 142 is an object formed in first joint section 106. Key 142 extends length 144 from preload face 110 in an axial direction of first pin 102. Key 142 is also raised from an exterior surface of first joint section 106. Second joint section 108 has slot 146 formed in second joint section 108. Slot 146 extends from preload face 112 into second joint section 108 in an axial direction of second pin 104. Slot 146 receives key 142 when first pin 102 and second pin 104 are mated.

In one illustrative embodiment, first pin 102 has only one key 142 and second pin 104 has only one slot 146. In this manner, slot 146 and key 142 maintain an orientation of first pin 102 with respect to second pin 104 when first pin 102 and second pin 104 are mated. For example, first pin 102 and second pin 104 may only be able to be mated in one orientation.

Maintaining the orientation of first pin 102 and second pin 104 maintains an orientation of wires in first wires 114 with respect to wires in second wires 124. For example, first pin 102 and second pin 104 may be two of several pins adjoined in a string of pins. Certain wires in second wires 124 may connect to certain connections in load 148. Maintaining the orientation of first wires 114 with respect to second wires 124 allows an operator of the string of pins to know which wires at the surface of a borehole are connected to the certain connections in load 148 down in the borehole.

In these illustrative embodiments, length 144 of key 142 is longer than the length of plug type connectors 134 protruding from preload face 110. Because key 142 is longer, key 142 will seat in slot 146 before plug type connectors 134 contact socket type connectors 138. As a result, connectors in plug type connectors 134 will not be connected to wrong connectors in socket type connectors 138. Key 142 being longer than plug type connectors 134 allows plug type connectors 134 and socket type connectors 138 to be properly oriented before being connected.

In these illustrative embodiments, load 148 is a device within a borehole that requires an electrical connection. Load 148 may be connected to an end of a string of pipes. For example, without limitation load 148 may be a sensing device, motor, drill, pump, and/or any other type of device inside of a borehole that may need an electrical connection. Source 150 is a device that sends and receives electrical signals. For example, source 150 may be a source of electrical energy. In other examples, source 150 may send and receive electrical signals from devices within a borehole. For example, source 150 may control load 148 through electrical signals. For example, without limitation, source 150 may be an electrical generator, electrical power source, data collection device, controller, and/or any type of device that may connect to load 148 in a borehole.

The illustration of subterranean production and exploration environment 100 in FIG. 1 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

In one illustrative embodiment, first pin 102 is a male pin, while second pin 104 is a female pin. First joint section 106 is adapted to be received inside second joint section 108. In another illustrative embodiment, first pin 102 is a female pin, while second pin 104 is a male pin. Second joint section 108 is adapted to be received inside first joint section 106.

In other illustrative embodiments, multiple different sources may be connected to multiple different loads using different wires in first wires 114 and second wires 124. In some embodiments, first wires 114 may be directly connected to source 150. In other embodiments, multiple pin connections may exist between first wires 114 and source 150. First wires 114 are connected to source 150 by additional components.

Figure 2:
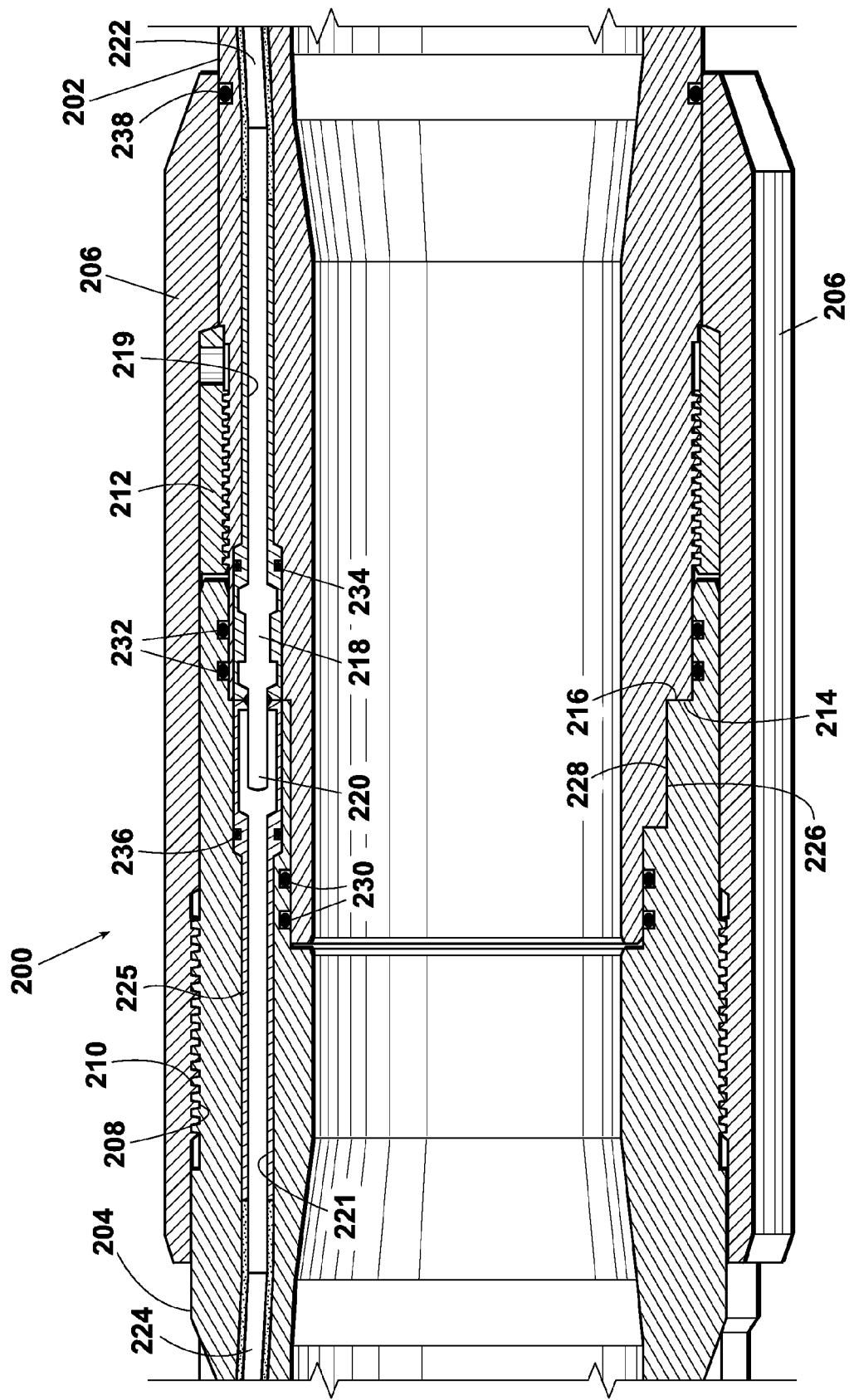
FIG. 2 is an illustration of a detailed cutaway view of wiring connections within a pair of adjoined pins in accordance with an illustrative embodiment.

With reference now to FIG. 2, an illustration of a detailed cutaway view of wiring connections within a pair of adjoined pins is depicted in accordance with an illustrative embodiment. Pair of adjoined pins 200 is an example of one embodiment of first pin 102 mated with second pin 104 in FIG. 1.

In this illustrative example, male pin 202 is mated with female pin 204. Coupling 206 secures male pin 202 and female pin 204 together. Coupling 206 has threads 208 on an interior surface of coupling 206. Threads 208 are matched to be received by threads 210 on an exterior surface of female pin 204. Load ring 212, when engaged with coupling 206, resists the axial movement of coupling 206 relative to male pin 202 in the direction of female pin 204. As threads 208 of coupling 206 are tightened onto threads 210 of female pin 204, coupling 206 draws male pin 202 and female pin 204 closer together. Also as coupling 206 is tightened, preload face 214 of male pin 202 contacts preload face 216 of female pin 204. Preload face 214 and preload face 216 may press against each other, building a preload force within pair of adjoined pins 200.

Inside pair of adjoined pins 200, plug type connector 218 connects with socket type connector 220 when male pin 202 and female pin 204 are mated. Plug type connector 218 sits within hole 219 inside of male pin 202. Socket type connector 220 sits within hole 221 inside of female pin 204. Wire 222 connects with plug type connector 218. Wire 224 connects with socket type connector 220. In this illustrative example, plug type connector 218, socket type connector 220, wire 222, and wire 224 are covered by insulating material 225.

Because the illustration of pair of adjoined pins 200 is a cutaway view, only one plug type connector and socket type connector are shown. In some embodiments, multiple plug type connectors and socket type connectors may be positioned at different points in a circumferential direction around pair of adjoined pins 200. In one illustrative embodiment, six plug type connectors and six socket type connectors may be utilized in pair of adjoined pins 200. The six plug type connectors and six socket type connectors may be positioned at 60° intervals with respect to the axis of pair of adjoined pins 200.

FIG. 2 also illustrates key 226 received by slot 228. As depicted, key extends from preload face 214 toward female pin 204. Slot 228 extends from preload face 216 away from male pin 202. Also as depicted, the length of key 226 extending from preload face 214 is longer than the portion of plug type connector 218 extending from preload face 214. Thus, key 226 will engage within slot 228 before plug type connector 218 connects with socket type connector 220 when male pin 202 and female pin 204 are mated.

In this illustrative example, set of seals 230 within female pin 204 reduce an amount of fluid that may be inside pair of adjoined pins 200 from reaching the connection between plug type connector 218 and socket type connector 220. Set of seals 230 contact an exterior surface of male pin 202 when male pin 202 and female pin 204 are mated. Set of seals 230 sit between the inside of pair of adjoined pins 200 and the interface between preload face 214 and preload face 216. A "set," as used herein with reference to an item, means one or more items.

Additionally, set of seals 232 within female pin 204 reduce an amount of fluid that may be outside of pair of adjoined pins 200 from reaching the connection between plug type connector 218 and socket type connector 220. Set of seals 232 contact an exterior surface of male pin 202 when male pin 202 and female pin 204 are mated. Set of seals 232 sit between the outside of pair of adjoined pins 200 and the interface between preload face 214 and preload face 216.

Seal 234 surrounds a circumferential surface of plug type connector 218. As used herein, a circumferential surface, when referring to objects, is a surface of the object that bounds the object in a circular fashion. For example, a circumferential surface may also be a surface corresponding to an outer circumference of a cylinder. Seal 234 reduces an amount of fluid that may have entered hole 219 from reaching the connection between plug type connector 218 and socket type connector 220.

In a similar manner, seal 236 surrounds a circumferential surface of socket type connector 220. Seal 236 reduces an amount of fluid that may have entered hole 221 from reaching the connection between plug type connector 218 and socket type connector 220. Preventing and/or reducing an amount of fluid from reaching the connection between plug type connector 218 and socket type connector 220 may prevent and/or reduce the connection from corroding over time. Preventing and/or reducing an amount of fluid from reaching the connection between plug type connector 218 and socket type connector 220 may also prevent electrical signals traveling along wire 224 and wire 222 from shorting.

As discussed above, multiple socket type connectors and plug type connections may be positioned within pair of adjoined pins 200. Thus, seal 234 may be one of a number of seals for a number of plug type connectors. Similarly, seal 236 may be one of a number of seals for a number of socket type connectors. A "number," as used herein with reference to an item, means one or more items.

Pair of adjoined pins 200 also includes seal 238 positioned around an exterior surface of male pin 202. Seal 238 sits between coupling 206 and male pin 202. Seal 238 reduces an amount of fluid from outside of pair of adjoined pins 200 from entering within pair of adjoined pins 200.

Figure 3:
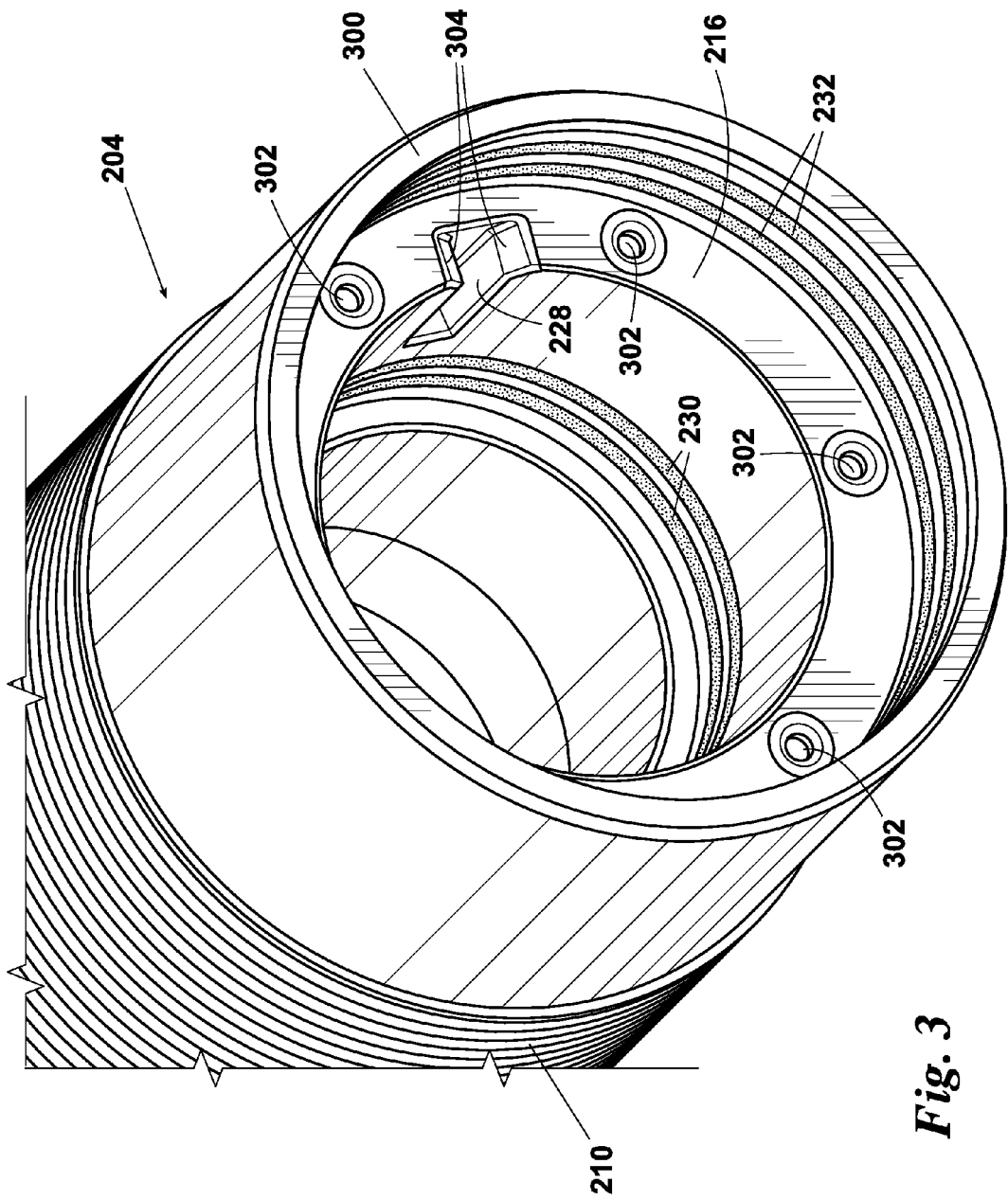
FIG. 3 is an illustration of an end of a female pin having wiring connectors in accordance with an illustrative embodiment.

With reference now to FIG. 3, an illustration of an end of a female pin having wiring connectors is depicted in accordance with an illustrative embodiment. In this illustrative example, female pin 204 in FIG. 2 is illustrated from end 300 of female pin 204. End 300 of female pin 204 is an example of one embodiment of second joint section 108 in second pin 104 in FIG. 1.

In this illustrative example, socket type connectors 302 are recessed within preload face 216. Socket type connectors 302 are matched to receive a wire and/or plug to connect wires in female pin 204 with the wires in a male pin when mated. In this example, four connectors in socket type connectors 302 are shown; however, any number of connectors may be used for any number of wires in female pin 204. Additionally, while socket type connectors 302 are depicted having a circular shape, in some embodiments socket type connectors 302 may be flat connectors for connecting flat wires and/or flat braided wires.

Set of seals 232 is positioned near end 300 of female pin 204 on a first side of socket type connectors 302. Set of seals 230 is positioned further inside female pin 204 on a second side of socket type connectors 302. Set of seals 230 and set of seals 232 form seals for adjoined pins when a male pin is connected with female pin 204. Set of seals 230 and set of seals 232 reduce fluids from within female pin 204 from leaking outside female pin 204 and/or material from outside female pin 204 from leaking into female pin 204. Because set of seals 230 and set of seals 232 are positioned on either side of the connectors, set of seals 230 and set of seals 232 insulate socket type connectors 302 from coming into contact with materials from either outside or inside female pin 204. Keeping socket type connectors 302 insulated is particularly useful in preventing the connection of wires from shorting. Keeping socket type connectors 302 insulated may also be useful in preventing the connections from corroding.

In this illustrative example, slot 228 has pair of flanks 304. Pair of flanks 304 is wider at preload face 216 than further inside female pin 204. Pair of flanks 304 allows a key on a male pin to seat inside slot 228.

Figure 4:
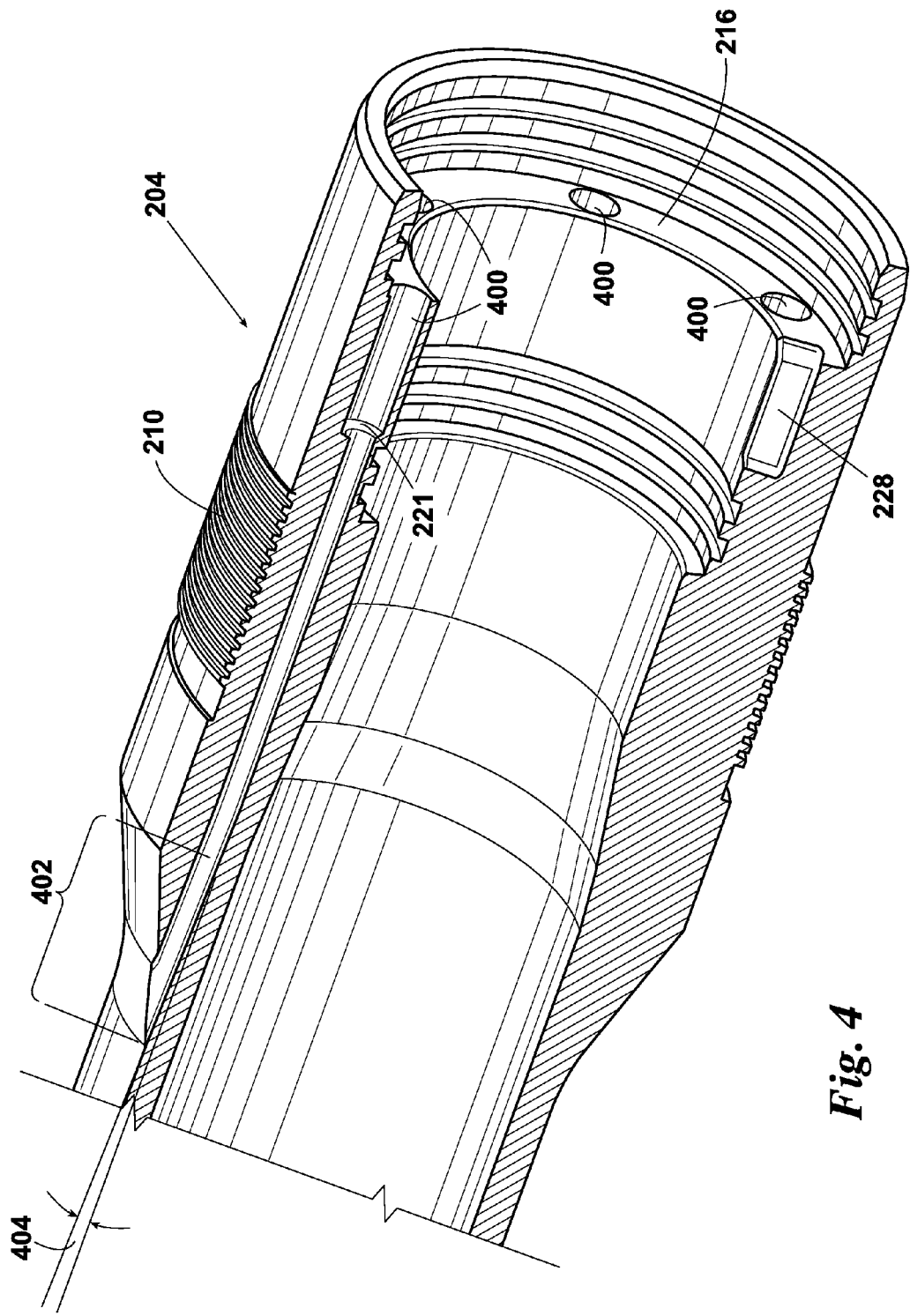
FIG. 4 is an illustration of a detailed cutaway view of a female pin having holes for insertion of wiring into the female pin in accordance with an illustrative embodiment.

With reference now to FIG. 4, an illustration of a detailed cutaway view of a female pin having holes for insertion of wiring into the female pin is depicted in accordance with an illustrative embodiment. In this illustrative example, female pin 204 from FIG. 2 is illustrated with holes 400 for insertion of wiring into female pin 204.

In this illustrative example, hole 221 is one of holes 400 in female pin 204. Hole 221 is formed inside of female pin 204. Portion 402 of hole 221 enters female pin 204 at angle 404. For example, wires may run along an exterior surface of female pin 204. To allow the wires to enter inside female pin 204, portion 402 of hole 221 enters female pin 204 at angle 404. In these examples, angle 404 is an acute angle. In this illustrative embodiment, angle 404 may have a value selected from a range of values from about 1 degree to about 5 degrees.

In other embodiments, wires may run along an interior surface of female pin 204. To allow the wires to terminate at preload face 216 of female pin 204, angle 404 may have a negative value so that hole 221 in may provide access for the wires by providing an opening in the interior surface of female pin 204 for access to the interior of female pin 204. For example, wires may run along an interior surface of female pin 204 before entering hole 221. In yet other embodiments, hole 221 may extend an entire length of female pin 204. The wires may sit within hole 221 for an entire length of female pin 204. Thus, angle 404 may have a value that is substantially equal to zero.

Figure 5:
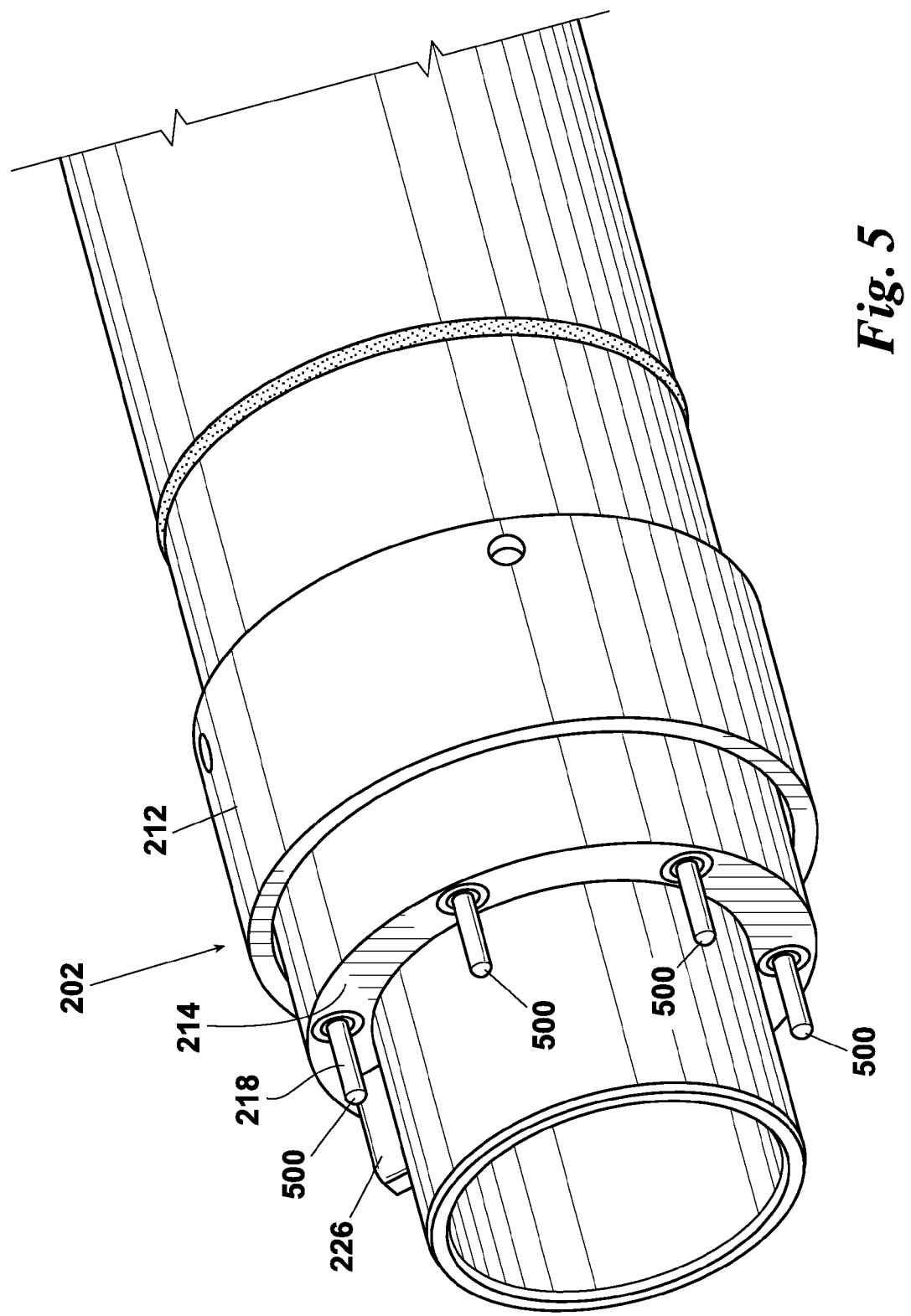
FIG. 5 is an illustration of a male pin having wiring connectors in accordance with an illustrative embodiment.

With reference now to FIG. 5, an illustration of a male pin having wiring connectors is depicted in accordance with an illustrative embodiment. In this illustrative example, male pin 202 from FIG. 2 is illustrated from a detailed view.

Plug type connectors 500 protrude from preload face 214 of male pin 202. Plug type connectors 500 are matched to connect with recessed or socket type of connectors in a female pin. In one embodiment, plug type connectors 500 is an Amphenol Radsok® connector, such as commercially available from Amphenol Industrial Operations 40-60 Delaware Avenue Sidney, New York 13838. However, other types of plug and socket type of connectors may be used, so long as the connectors are appropriate for forming an electrical connection between wires. For example, while plug type connectors 500 are depicted having a circular shape, in some embodiments plug type connectors 500 may be flat connectors for connecting flat wires and/or flat braided wires.

Figure 6:
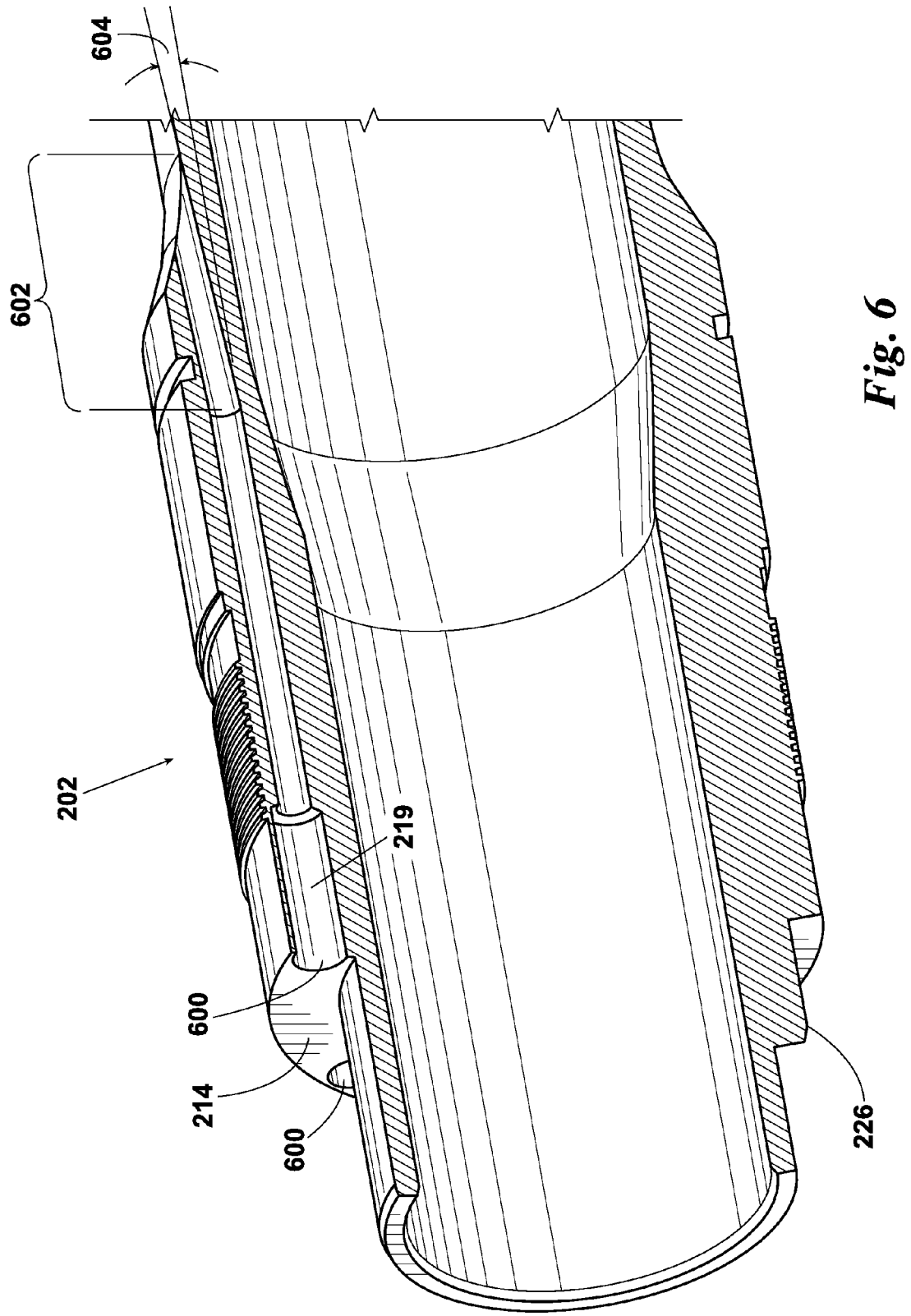
FIG. 6 is an illustration of a detailed cutaway view of a male pin having holes for insertion of wiring into the male pin in accordance with an illustrative embodiment.

With reference now to FIG. 6, an illustration of a detailed cutaway view of a male pin having holes for insertion of wiring into the male pin is depicted in accordance with an illustrative embodiment. In this illustrative example, male pin 202 from FIG. 2 is illustrated with holes 600 for insertion of wiring into male pin 202.

In this illustrative example, hole 219 is one of holes 600 in male pin 202. Hole 219 is formed inside of male pin 202. Portion 602 of hole 219 enters male pin 202 at angle 604. For example, wires may run along an exterior surface of male pin 202. To allow the wires to enter inside male pin 202, portion 602 of hole 219 enters male pin 202 at angle 604. In these examples, angle 604 is an acute angle. In this illustrative embodiment, angle 604 may have a value selected from a range of values from about 1 degree to about 5 degrees.

In other embodiments, wires may run along an interior surface of male pin 202. To allow the wires to terminate at preload face 214 of male pin 202, angle 604 may have a negative value so that hole 219 in may provide access for the wires by providing an opening in the interior surface male pin 202 for access to the interior of male pin 202. For example, wires may run along an interior surface of male pin 202 before entering hole 219. In yet other embodiments, hole 219 may extend an entire length of male pin 202. The wires may sit within hole 219 for an entire length of male pin 202. Thus, angle 604 may have a value that is substantially equal to zero.

Figure 7:
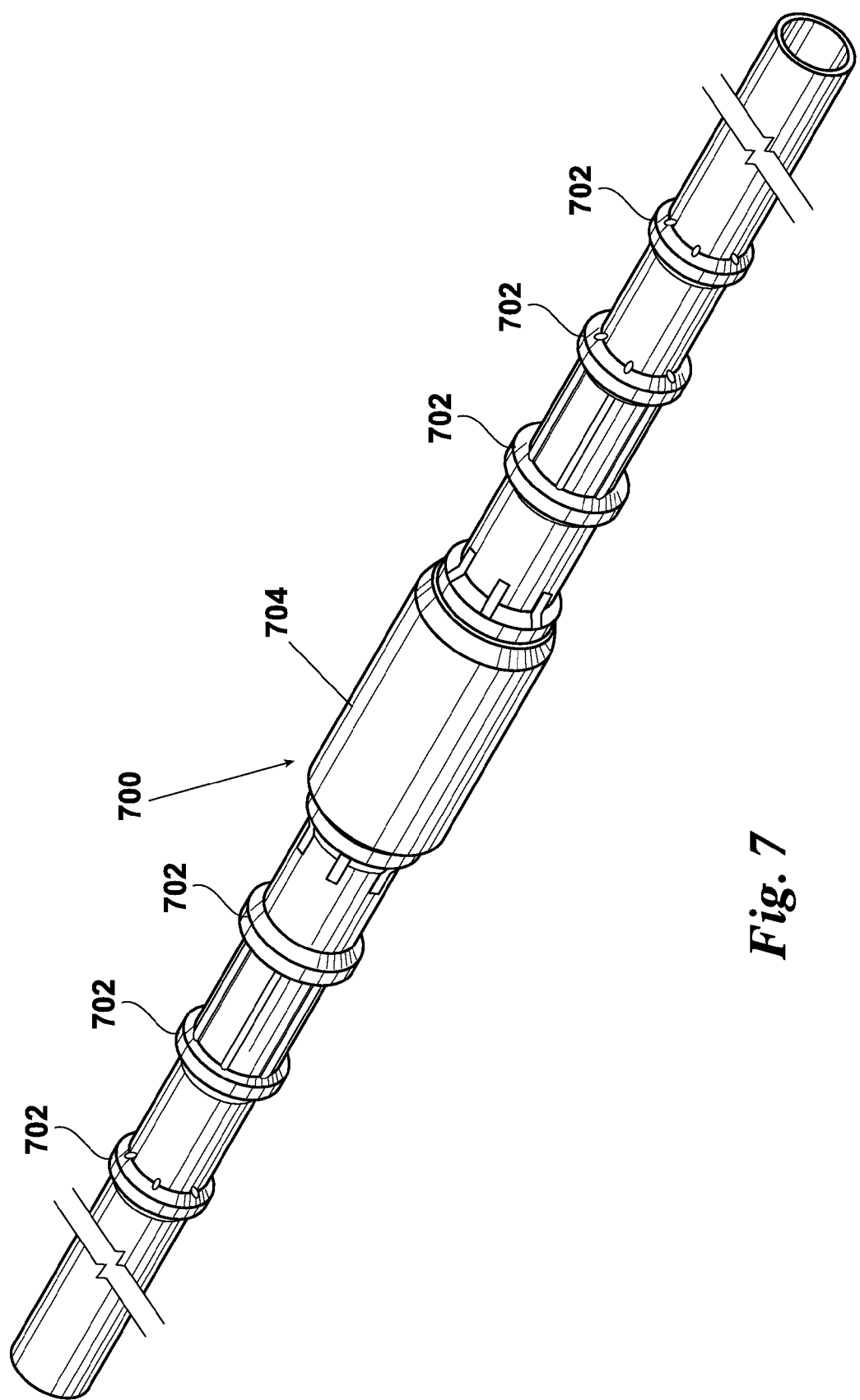
FIG. 7 is an illustration of a pair of pins at a made-up position having spacers for wiring in accordance with an illustrative embodiment.

With reference now to FIG. 7, an illustration of a pair of pins at a made-up position having spacers for wiring is depicted in accordance with an illustrative embodiment. In this illustrative example, pair of pins 700 is an example of one embodiment of pair of adjoined pins 200 in FIG. 2.

Pair of pins 700 is an embodiment where pair of pins 700 is made from fiberglass and has a metal tube lining the interior of pair of pins 700. The portion of pair of pins 700 made from fiberglass provides strength and support for pair of pins 700 and wiring connections between pins in pair of pins 700. The support and strength allows pair of pins 700 and wiring connections between pins in pair of pins 700 to withstand exterior and internal loads. The metal tube provides a seal from fluids flowing within pins in pair of pins 700.

Profiles 702 are formed on pair of pins 700. In an illustrative embodiment, profiles 702 may be welds or upsets present on pair of pins 700. For example, profiles 702 may be welded or bonded onto pair of pins 700. In other examples, pair of pins 700 may be machined to have a number of profiles 702. Profiles 702 may provide an increase in the outer diameter of pair of pins 700. Profiles 702 may provide additional strength and support for the fiberglass portions. The increased outer diameter from profiles 702 may provide mechanical support for the fiberglass portions. The pins in pair of pins 700 are illustrated at a made up position. Coupling 704 joins the pins in pair of pins 700 together.

The materials used in the embodiments described as illustrated in FIG. 7 are for example only. Any number of different materials may be used in place of, or in addition to, the materials described above. Specifically, other materials may be used in place of fiberglass in the portions described above as being fiberglass portions. For example, without limitation the fiberglass portions of pair of pins 700 may be formed from materials selected from a group comprising fiberglass, carbon reinforced epoxy, other synthetic fiber reinforced thermoplastic, and polymers such as polyethylene and polyurethane, for example. The fiberglass may be glass fiber reinforced polyester or epoxy. As previously discussed, other materials may be used in place of, or in addition to, fiberglass in the fiberglass portions. Additionally, for example, without limitation, the metal for the metal tube may be formed from materials selected from a group comprising at least one of steel, stainless steel, other steel alloys, aluminum and aluminum alloys, titanium and titanium alloys, nickel alloys, copper-based alloys, and any combinations thereof. As used herein, the phrase "at least one of," when used with a list of items, means that different combinations of one or more of the listed items may be used and only one of each item in the list may be needed.

The illustration of pair of pins 700 in FIG. 7 is not meant to imply physical or architectural limitations to the manner in which different illustrative embodiments may be implemented. Other components in addition to, and/or in place of, the ones illustrated may be used. Some components may be unnecessary in some illustrative embodiments.

Figure 8:
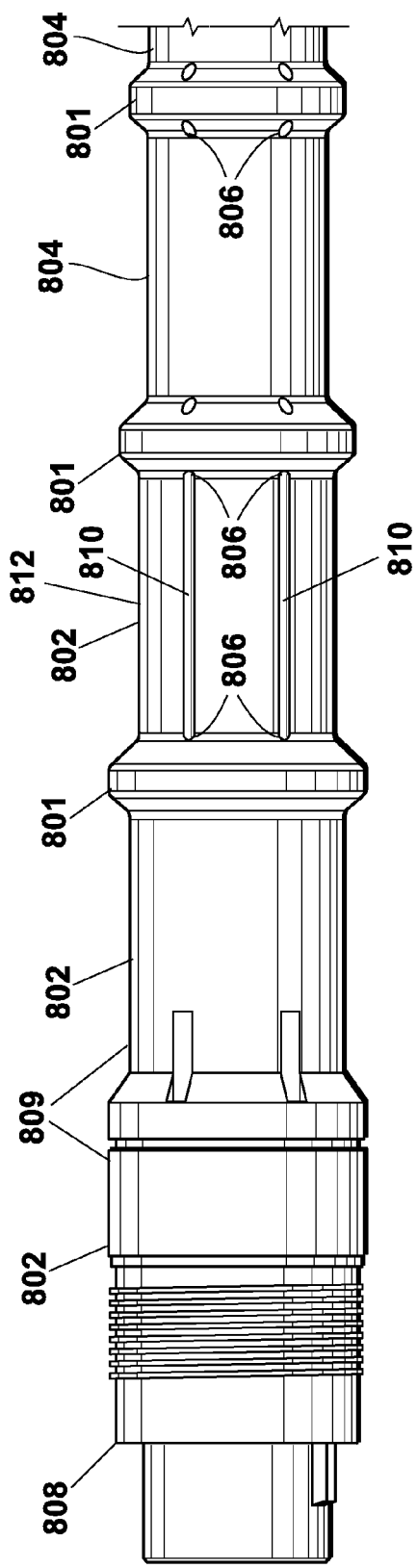
FIG. 8 is an illustration of a detailed view of a male pin from the pair of pins illustrated in FIG. 7 in accordance with an illustrative embodiment.

FIG. 8 is an illustration of a detailed view of a male pin from the pair of pins illustrated in FIG. 7 depicted in accordance with an illustrative embodiment.

Figure 9:
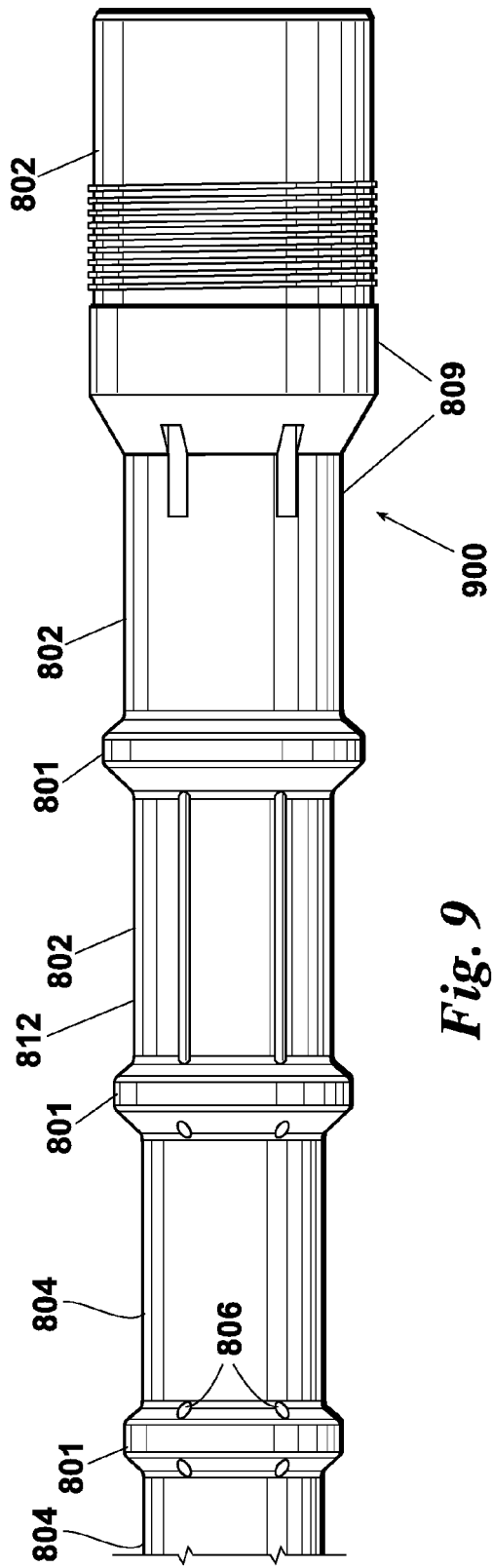
FIG. 9 is an illustration of a detailed view of a female pin from the pair of pins illustrated in FIG. 7 in accordance with an illustrative embodiment.

FIG. 9 is an illustration of a detailed view of a female pin from the pair of pins illustrated in FIG. 7 depicted in accordance with an illustrative embodiment.

In these illustrative examples, profiles 801 are formed on the surface of male pin 800 and female pin 900. Profiles 801 of male pin 800 and female pin 900 connect fiberglass portions 802 of male pin 800 and female pin 900 with metal tubes 804. Boreholes 806 are formed in profiles 801 to allow wires to pass through profiles 801 and run along the exterior of metal tubes 804. Profiles 801 also maintain a position of the wires relative to male pin 800 and female pin 900. For example, profiles 801 may hold wires in place. Profiles 801 may also act as spacers maintaining a distance between individual wires.

Fiberglass portions 802 of male pin 800 and female pin 900 have varying levels of thickness of outer diameter thickness. For example, fiberglass portions 802 of male pin 800 may have decreasing levels of thickness as the distance from joint section 808 increases. The decreasing levels of thickness provide additional strength and support near joint section 808 where internal and exterior loads may be greater. Depending on the thickness of the fiberglass portions 802, wires may run inside of fiberglass portions 802. For example, wires may run inside of fiberglass portions 809. In other examples, slots 810 for the wires are formed in fiberglass portions 812. Slots 810 in fiberglass portions 812 allow the wires to be placed and maintained along metal tubes 804.

Figure 10:
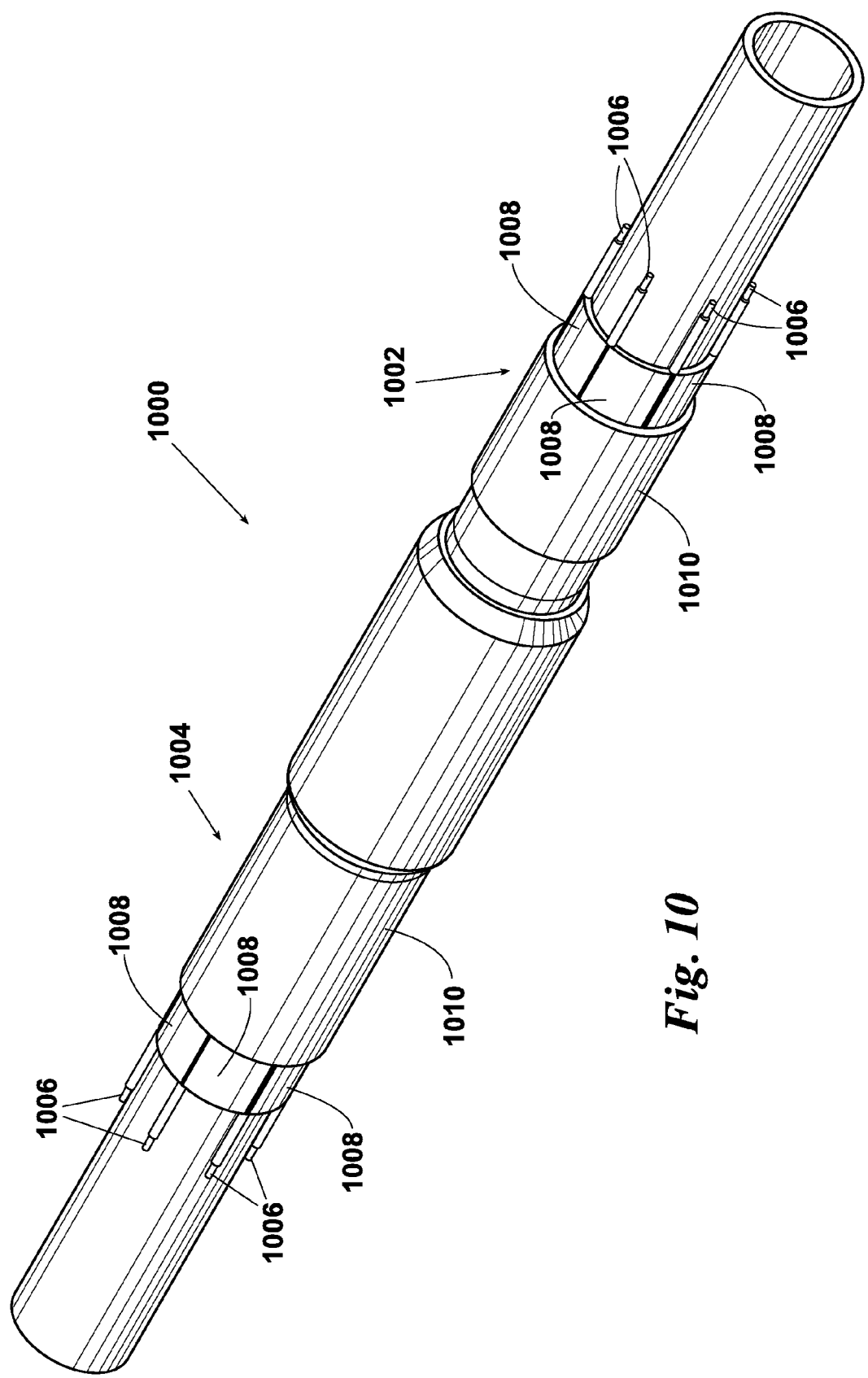
FIG. 10 is an illustration of a pair of pins at a made up position having wiring in accordance with an illustrative embodiment.

With reference now to FIG. 10, an illustration of a pair of pins at a made up position having wiring is depicted in accordance with an illustrative embodiment. Pair of pins 1000 is an example of another embodiment of pair of pins 200 in FIG. 2.

In this illustrative example, male pin 1002 and female pin 1004 have wires 1006 positioned along an exterior surface of male pin 1002 and female pin 1004. Wires 1006 may be positioned parallel to each other across the exterior surface of male pin 1002 and female pin 1004. Wires 1006 may extend an entire length of male pin 1002 and female pin 1004. While, round wires are illustrated in FIG. 10, flat wires and/or flat braided may be used in place of, or in addition to, the round wires.

Spacers 1008 are placed over and between wires in wires 1006. In this illustrative example, spacers 1008 are illustrated from a cutaway view. Spacers 1008 are illustrated at a length to allow wires 1006 to be illustrated. Spacers 1008 may extend an entire length of male pin 1002 and female pin 1004.

Wires 1006 may be covered with an insulating material. Additionally, spacers 1008 may act as an insulator. For example, without limitation, spacers 1008 may be formed from materials selected from a group comprising at least one of resin, resin coated longitudinal fibers, and resin with reinforcing chopped fibers. The material selected for the resin can be, for example, without limitation, polyester, epoxy, or other thermoset plastic. The material selected for the fibers can be, for example, without limitation, glass, carbon, or other synthetic fibers such as aramids, for example.

Layers of material 1010 are placed over wires 1006 and spacers 1008. Layers of material 1010 may act as a cover to shield wires 1006 from exposure to exterior elements. In one embodiment, layers of material 1010 may have a thickness that is about 0.25 inches. For example, without limitation, layers of material 1010 may be formed from materials selected from a group comprising at least one of fiberglass, carbon reinforced epoxy, other synthetic fiber reinforced thermoplastic, and polymers, such as, polyethylene, and polyurethane, for example. The fiberglass may be glass fiber reinforced polyester or epoxy. Further, other materials may also be selected in place of, or in addition to, fiberglass to form the layer of material. One of ordinary skill in the art would know that any materials that are resistant to breakdown in temperature, resistant to abrasive wear, and/or have resistance to permeability of environmental materials may be used. Additional protective layers or coatings may be placed around the layer of material. The additional protective layers or coatings may be used improve the resistance to abrasion, temperature, and/or permeability of environmental materials.

In forming layers of material 1010, for example, the materials may be wound onto the cylindrical assembly as filaments or tapes. In an additional example, layers of material 1010 could also be formed from sheets of fiber reinforced epoxy, such as pre-pregs, for example. The strength of layers of material 1010 is determined by the fiber material, the direction of the winding or pre-preg applied, and/or the thickness of the built up layer.

The illustration of pair of pins 1000 is directed to an advantageous embodiment where pair of pins 1000 is formed from a material consisting essentially of metal. For example, without limitation, the metal for pair of pins 1000 may be formed from materials selected from a group comprising at least one of steel, stainless steel, other steel alloys, aluminum and aluminum alloys, titanium and titanium alloys, nickel alloys, copper-based alloys and combinations thereof. The use of metal in pair of pins 1000 provides strength to withstand internal loads and/or exterior forces that may be applied to the pin.

The illustration of pair of pins 1000 in FIG. 10 is not meant to imply physical or architectural limitations to the manner in which different illustrative embodiments may be implemented. Other components in addition to, and/or in place of, the ones illustrated may be used. Some components may be unnecessary in some illustrative embodiments.

Figure 11:
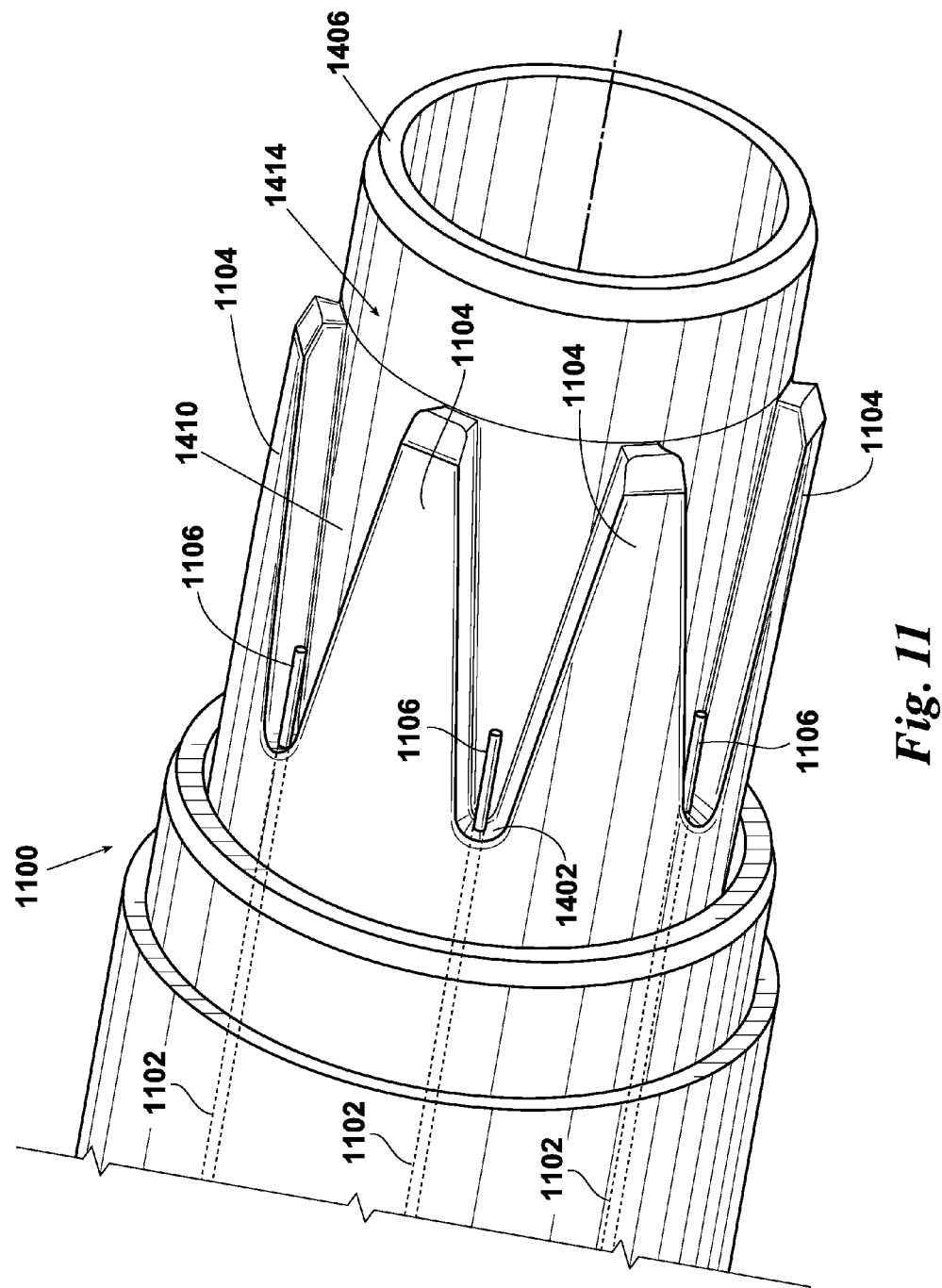
FIG. 11 is an illustration of a male pin having tapered splines and wiring in accordance with an illustrative embodiment.

FIG. 11 is an illustration of a male pin having tapered splines and wiring is depicted in accordance with an illustrative embodiment. Male pin 1100 in FIG. 11 is an example of one embodiment of male pin 202 in FIG. 2. The male pin 1100 includes a preload face 1402 that is spaced from an end 1406. At least one spline 1104 extends from an outer surface 1410 of a cylindrical portion 1414 that is located between the end 1406 and the preload face 1402.

Figure 12:
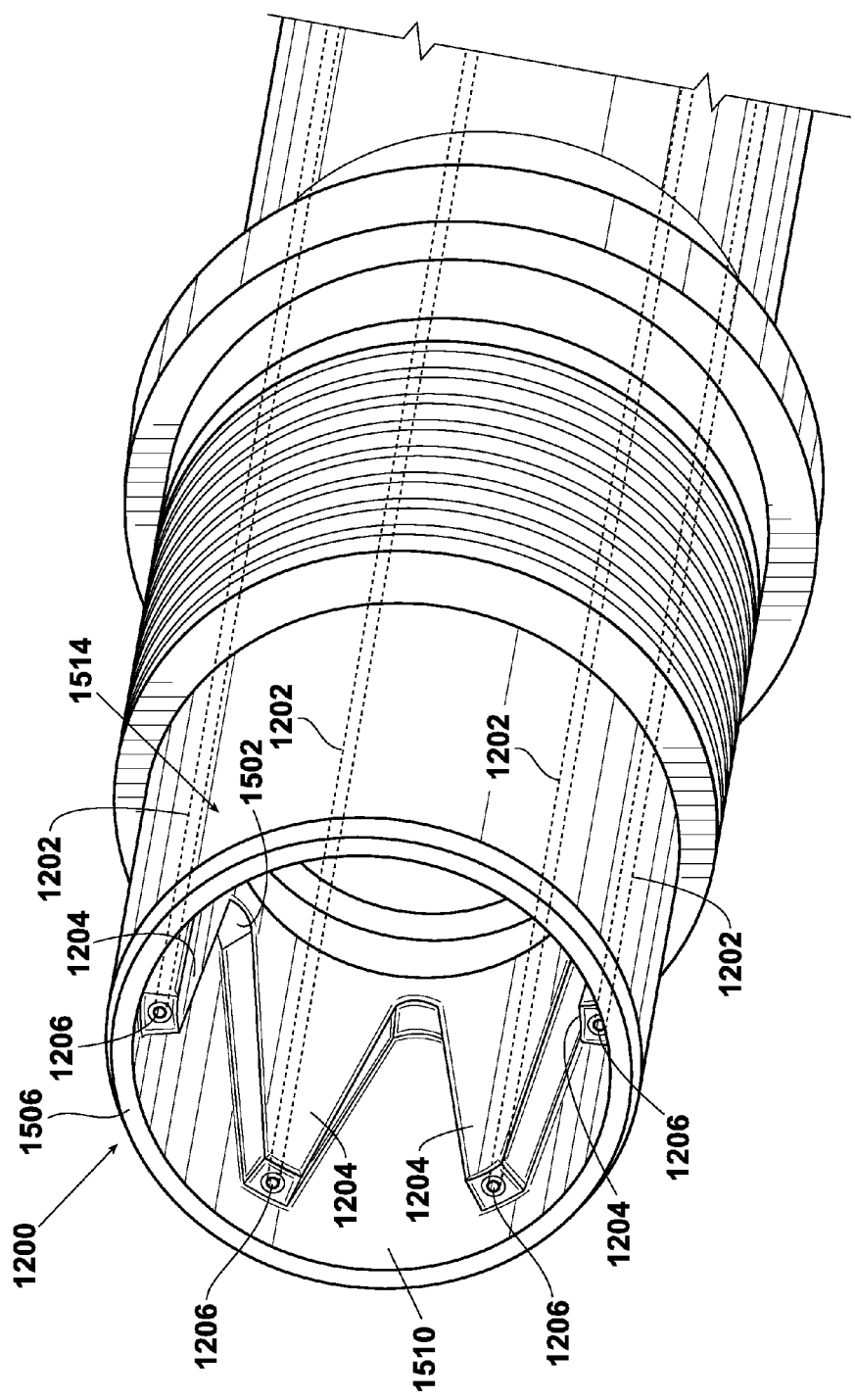
FIG. 12 is an illustration of a female pin having tapered splines and wiring in accordance with an illustrative embodiment.

FIG. 12 is an illustration of a female pin having tapered splines and wiring depicted in accordance with an illustrative embodiment. Female pin 1200 in FIG. 12 is an example of one embodiment of female pin 204 in FIG. 2. The female pin 1200 includes a preload face 1502 that is spaced from an end 1506. At least one spline 1204 extends from an innner surface 1410 of a cylindrical portion 1514 that is located between the end 1506 and the preload face 1502.

The tapered spline connections between male pin 1100 and female pin 1200 are disclosed in the '569 application. The wiring and connections between wiring on male pin 1100 and female pin 1200 as described above may also be applied to other tapered spline connections described in the '569 application.

In these illustrative examples, male pin 1100 includes wires 1102 and tapered splines 1104. As depicted, wires 1102 are positioned between bases of adjacent splines in tapered splines 1104. Wires 1102 end in plug type connectors 1106. Female pin 1200 includes wires 1202 and tapered splines 1204. As depicted, wires 1202 are positioned at tips of splines in tapered splines 1204. Wires 1202 end in socket type connectors 1206. Female pin 1200 may be joined with male pin 1100. In this embodiment, socket type connectors 1206 are configured to receive plug type connectors 1106.

The illustrations of male pin 1100 in FIG. 11 and female pin 1200 in FIG. 12 are not meant to imply physical or architectural limitations to the manner in which different illustrative embodiments may be implemented. Other components in addition to, and/or in place of, the ones illustrated may be used. Some components may be unnecessary in some illustrative embodiments.

Figure 13:
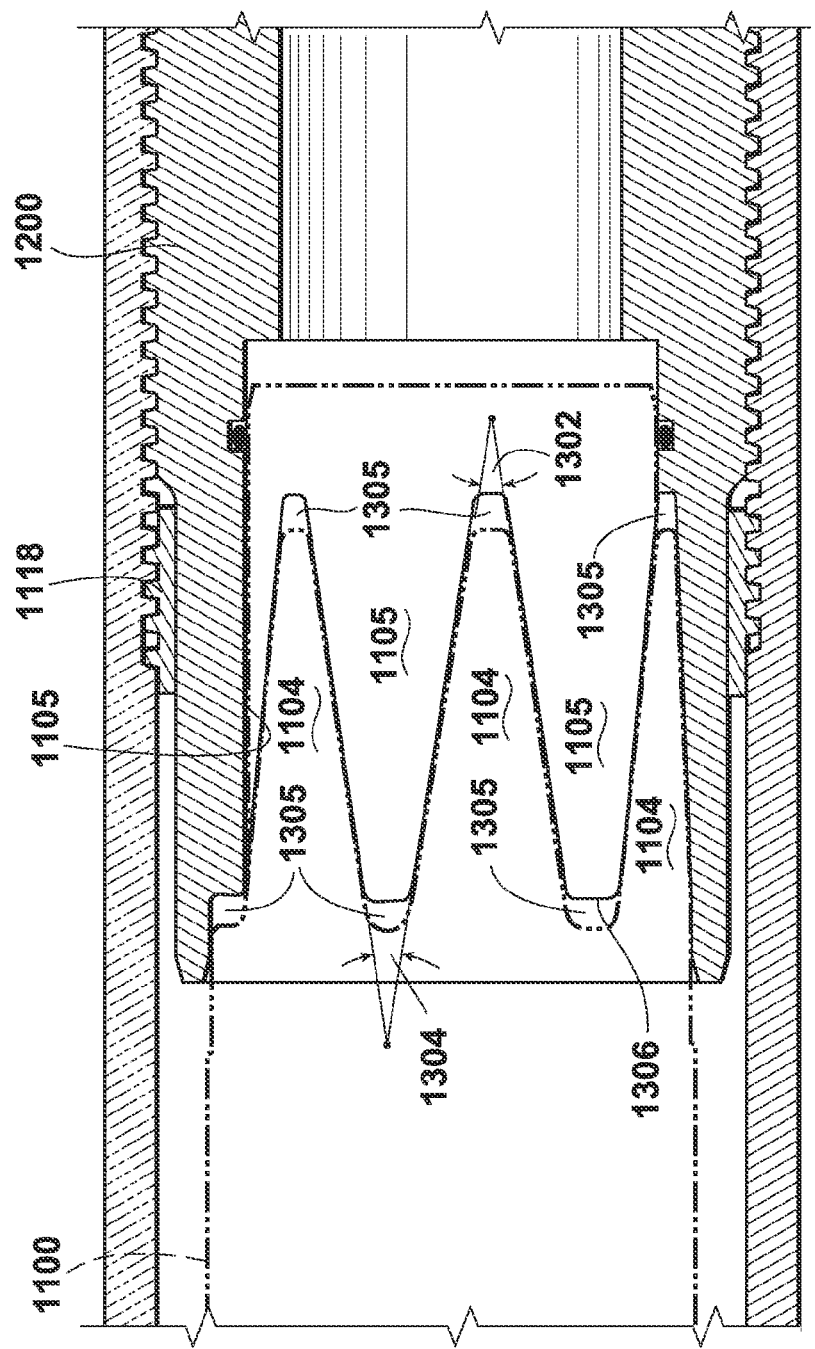
FIG. 13 is an illustration of an internal cross-sectional view of a pair of joint sections at a fully engaged stage in accordance with an illustrative embodiment.

With reference now to FIG. 13, an illustration of an internal cross-sectional view of a pair of joint sections at a fully engaged stage is depicted in accordance with an illustrative embodiment. In this illustrative example, connection section at an engaged stage. This internal view provides greater detail regarding the position of plurality of splines 1104 and plurality of splines 1105.

As depicted, each spline of plurality of splines 1104 is matched with a recessed area located between adjacent splines of plurality of splines 1105. Likewise, each spline of plurality of splines 1105 is matched with a recessed area located between adjacent splines of plurality of splines 1104. In this example, the degree of spline flank angle 1302 is substantially equal to the degree of spline flank angle 1304. Because the degree of spline flank angle 1302 is substantially equal to the degree of spline flank angle 1304, each flank of the splines of plurality of splines 1104 will come in contact with and seat on an opposing flank of a spline in of plurality of splines 1105. Tightening of a coupling forces plurality of splines 1104 between and towards plurality of splines 1105. In this example, plurality of splines 1104 and 1105 also do not bottom out on opposing surfaces of male pin 1100 and female pin 1200. Thus, gaps 1305 are formed between tips 1306 of each of plurality of splines 1104 and 1105 and portions of the flanks of opposing splines. In this example, gaps 1305 may have a length that ranges from about $3/32$ of an inch to about $9/32$ of an inch in the axial direction. However, in other examples the length of gaps 1305 may be increased or decreased based upon a tightening and/or gap size considerations.

In this illustrated embodiment, the angle selected for spline flank angle 1302 and 1304 has a value of about 18 degrees. However, in other advantageous embodiments spline flank angle 1302 and 1304 may be selected from a range between an angle having a value of about 10 degrees and an angle having a value of about 50 degrees. One of ordinary skill in the art would understand that as a spline flank angle approaches 90 degrees the mechanical advantage between opposing splines is reduced. Correspondingly, as a spline flank angle approaches zero degrees, disassembly of the joint sections may become more difficult once forces have been applied to the connection.

The illustration of connection section in FIG. 13 is not meant to imply physical or architectural limitations to the manner in which different illustrative embodiments may be implemented. Other components in addition to, and/or in place of, the ones illustrated may be used. Some components may be unnecessary in some illustrative embodiments. For example, in different illustrative embodiments any number of splines may be used. In other examples, splines may be any number of different sizes. Further, different illustrative embodiments may include splines having any number of different spline flank angles including angles beyond any previously discussed ranges. Still further, the spline flanks may be curved. For example, the spline flanks may have a slope that may be approximated by a parabolic curve. The spline flank angle may be formed by lines that are tangential to points on each flank in the pair.

Thus, the illustrative embodiments provide an apparatus for electrical wiring. The apparatus includes a first pin and a second pin. The first pin has a first joint section. The first joint section has a first holes extending a length of the first joint section and terminating at a first preload face. The second pin has a second joint section. The second joint section has a second holes extending a length of the first joint section and terminating at a second preload face. The second joint section is adapted to receive the first joint section and the first holes match the second holes when the first pin and the second pin are mated.

The description of the different embodiments of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application to enable others of ordinary skill in the art to understand the invention for various embodiments, with various modifications as are suited to the particular use contemplated.

What is claimed is:

1. An apparatus comprising:
a first pin having a first joint section, the first joint section having first holes extending a length of the first joint section and terminating at a first preload face, the first pin having an end that is spaced from the first preload face which defines a first cylindrical portion with an outer surface;
a second pin having a second joint section, the second joint section having second holes extending a length of the second joint section and terminating at a second preload face, the second pin having an end that is spaced from the second preload face which defines a second cylindrical portion with an inner surface, and the second joint section adapted to receive the first joint section and the first holes matching the second holes when the first pin and the second pin are mated;
first tapered splines on the first pin, the first tapered splines extending outwardly from the outer surface of the first cylindrical portion of the first pin and axially from the first preload face, a spline in the first tapered splines having a base at the first preload face and a width that narrows towards a tip of the spline;
second tapered splines on the second pin, the second tapered splines extending inwardly from the inner surface of the second cylindrical portion of the second pin and axially from the second preload face, a spline in the second tapered splines having a base at the second preload face and a width that narrows towards a tip of the spline; and
wherein the first tapered splines are adapted to be received by second tapered splines when the first pin and the second pin are mated.

2. The apparatus of claim 1 further comprising:
first wires running along an exterior surface of the first pin, a first wire in the first wires entering a first hole in the first joint section at an angle relative to the exterior surface of the first pin; and
plug type connectors, a plug type connector in the plug type connectors connected to the first wire, the plug type connector extending from the first preload face.

3. The apparatus of claim 2 further comprising: spacers positioned along the exterior surface of the first pin, the spacers separating wires in the first wires for a length of the first wires; and
a layer of material covering the spacers and the first wires.

4. The apparatus of claim 2, wherein the first wires are insulated wires insulated by an insulating material, the apparatus further comprising:
a set of profiles surrounding a circumference of the exterior surface of the first pin, the set of profiles having third holes for maintaining a position of the insulated wires relative to the first pin, wherein a portion of the insulated wires not within the first holes is exposed.

5. The apparatus of claim 2 further comprising: seals for the first wires, a seal in the seals positioned around a wire in the first wires and contacting a circumferential surface of a hole in the first holes in the first pin, the seals adapted to reduce an amount of fluid that enters the first holes from reaching a plug type connector in the plug type connectors.

6. The apparatus of claim 2, wherein the angle is an acute angle having a value selected from a range of values from about one degree to about five degrees.

7. The apparatus of claim 2 further comprising:
second wires running along an exterior surface of the second pin, a second wire in the second wires entering a second hole in the second joint section at an angle relative to the exterior surface of the second pin; and
socket type connectors, a socket type connector in the socket type connectors connected to the second wire, the socket type connector positioned within the second hole and terminating at the second preload face, the socket type connector adapted to receive one of the plug type connectors when the first pin and the second pin are mated.

8. The apparatus of claim 7, wherein the first pin is a male pin and the second pin is a female pin, the apparatus further comprising:
a set of seals positioned on an interior surface of the female pin, the set of seals contacting an portion of the male pin inserted into the female pin when the male pin and the female pin are mated.

9. The apparatus of claim 1 further comprising:
a coupling having first threads on an interior surface of the coupling, the coupling positioned around an exterior surface of the first pin, the threads adapted to be received by second threads on an exterior surface of the second pin when the first pin and the second pin are mated by moving the preload face of the first pin and the second preload face of the second pin together; and
a ring around the exterior surface of the second pin, the ring having an outer diameter that is larger than an inner diameter of a portion of the coupling.

10. The apparatus of claim 1, wherein the first pin is at least one of a drill pipe, tubing, and casing, and the second pin is at least one of a drill pipe, tubing, and casing.

11. The apparatus of claim 1, wherein each of the first number of splines further defined by a pair of flanks that extend from the base to the tip wherein the pair of flanks forms a first spline angle;
wherein each of the second number of splines further defined by a pair of flanks that extend from the base to the tip wherein the pair of flanks forms a second spline angle; and
wherein the first spline angle and the second spline angle, which is substantially equal to the degree of the first spline angle, wherein each flank of the plurality of first splines contacts a seat on a corresponding flank of the plurality of second splines.

12. The apparatus of claim 11, wherein when the first pin and the second pin are connected, the tips located at the end of each of the first splines are spaced from the intersection of adjacent flanks of the second pin, and wherein the tips located at the end of each of the second splines are spaced from the intersection of adjacent flanks of the first pin.

13. The apparatus of claim 11, wherein the first spline angle and the second spline angle are different.

14. The apparatus of claim 11, wherein the flanks of the first number of splines and the flanks of the second number of splines are curved.

15. The apparatus of claim 11, wherein the flanks of the first number of splines and the flanks of the second number of splines are approximated by a parabolic curve.

16. An apparatus comprising:
a pin extending along an axis having a preload face that is spaced from an end of the pin, which defines a cylindrical portion having an outer surface, the pin having a plurality of tapered splines that extend outwardly from the outer surface of the cylindrical portion and axially from the preload face, a spline in the plurality of tapered splines having a base at the preload face and a width that narrows towards a tip of the spline;
a plurality of wires, a first portion of each of the wires running along an exterior surface of the pin in a direction of the axis, a second portion of each of the wires inside the pin extending towards the end of the pin;
spacers positioned along the exterior surface of the pin, the spacers separating wires in the wires for the first portion of the wires; and
a layer of material covering the spacers and the wires.

17. The apparatus of claim 16, wherein the pin is a first pin, the wires are first wires, and the preload face is a first preload face, wherein a length of the first wires protrudes from the first preload face, the apparatus further comprising:
a second pin having a second preload face that is spaced from an end of the second pin, which defines a second cylindrical portion having an inner surface, the second pin having a plurality of tapered splines that extend inwardly from the inner surface of the second cylindrical portion and axially from the second preload face, a spline in the plurality of tapered splines having a base at the second preload face and a width that narrows towards a tip of the spline; and
a plurality of second wires running along the second pin, a wire within the second wires terminating in a socket type connector, the socket type connector embedded within the second face and adapted to receive one of the first wires protruding from the face of the first pin.

18. The apparatus of claim 17, wherein the first pin is a male pin and the second pin is female pin, the apparatus further comprising:
plugs that protrude from the first pin, the plugs formed from the first wires, the plugs adapted to be received by sockets when the male pin and the female pin are mated by moving the first face and the second face together, and wherein the socket type connector is one of the sockets.

19. The apparatus of claim 16, wherein the second portion of the wires enters the pin at an acute angle relative to the axis, the apparatus further comprising:
holes formed within the pin and extending a length of the pin towards the face, wherein the holes have a first portion entering the pin at the acute angle and a second portion that runs substantially parallel to the axis and terminates at the face of the pin.

20. The apparatus of claim 19 further comprising:
seals for the wires, a seal in the seals positioned around a wire in the wires and contacting a circumferential surface of a hole in the holes in the pin, the seals adapted to reduce an amount of fluid that enters the holes from reaching an end of the wires near the end of the pin.

21. A pair of pins comprising:
a male pin having a first joint section, the first joint section having first holes extending a length of the first joint section and terminating at a first preload face, the male pin having an end that is spaced from the first preload face which defines a first cylindrical portion with an outer surface;

first wires running along an exterior surface of the male pin, a first wire in the first wires entering a first hole in the first joint section at a first angle relative to the exterior surface of the male pin, wherein the first angle is an acute angle having a value selected from a range of values from about one degree to about five degrees;

a plug type connectors, a plug type connector in the plug type connectors connected to the first wire, the plug type connector extending from the first preload face;

a female pin having a second joint section, the second joint section having second holes extending a length of the first joint section and terminating at a second preload face, the female pin having an end that is spaced from the second preload face which defines a second cylindrical portion with an inner surface, and the second joint section adapted to receive the first joint section and the first holes matching the second holes when the male pin and the female pin are mated;

second wires running along an exterior surface of the female pin, a second wire in the second wires entering a second hole in the second joint section at a second angle relative to the exterior surface of the female pin, wherein the second angle is an acute angle having a value selected from a range of values from about one degree to about five degrees and;

socket type connectors, a socket type connector in the socket type connectors connected to the second wire, the socket type connector positioned within the second hole and terminating at the second preload face, the socket type connector adapted to receive one of the plug type connectors when the male pin and the female pin are mated;

first tapered splines on the first pin, the first tapered splines extending outwardly from outer surface of the first cylindrical portion of the first pin and axially from the first preload face, a spline in the first tapered splines having a base at the first preload face and a width that narrows towards a tip of the spline;

second tapered splines on the second pin, the second tapered splines extending inwardly from the inner surface of the second cylindrical portion of the second pin and axially from a second preload face, a spline in the second tapered splines having a base at the second preload face and a width that narrows towards a tip of the spline; and wherein the first tapered splines are adapted to be received by second tapered splines when the first pin and the second pin are mated.

22. The pair of pins of claim 21 further comprising:

first spacers positioned along the exterior surface of the male pin, the first spacers separating wires in the first wires for a length of the first wires;

a layer of material covering the spacers and the first wires;

second spacers positioned along the exterior surface of the female pin, the second spacers separating wires in the second wires for a length of the second wires; and a layer of material covering the spacers and the second wires.

23. The pair of pins of claim 21, wherein the first wires are insulated wires insulated by an insulating material, the pair of pins further comprising:

a set of profiles surrounding a circumference of the exterior surface of the male pin, the set of profiles having a third holes for maintaining a position of the insulated wires relative to the male pin, wherein a portion of the insulated wires not within the first holes is exposed.

24. An apparatus comprising:

a first pin having a first joint section, the first joint section having first holes extending a length of the first joint section and terminating at a first preload face;

a second pin having a second joint section, the second joint section having second holes extending a length of the second joint section and terminating at a second preload face, the second joint section adapted to receive the first joint section and the first holes matching the second holes when the first pin and the second pin are mated;

first tapered splines on the first pin, the first tapered splines extending outwardly from an exterior surface of the first pin and axially from the first preload face, a spline in the first tapered splines having a base at the first preload face and a width that narrows towards a tip of the spline;

second tapered splines on the second pin, the second tapered splines extending outwardly from an exterior surface of the second pin and axially from the second preload face, a spline in the second tapered splines having a base at the second preload face and a width that narrows towards a tip of the spline; and wherein the first tapered splines are adapted to be received by second tapered splines when the first pin and the second pin are mated;

wherein each of the first number of splines further defined by a pair of flanks that extend from the base to the tip wherein the pair of flanks forms a first spline angle;

wherein each of the second number of splines further defined by a pair of flanks that extend from the base to the tip wherein the pair of flanks forms a second spline angle;

wherein the first spline angle and the second spline angle, which is substantially equal to the degree of the first spline angle, wherein each flank of the plurality of first splines contacts a seat on a corresponding flank of the plurality of second splines; and wherein when the first pin and the second pin are connected, the tips located at the end of each of the first splines are spaced from the intersection of adjacent flanks of the second pin, and wherein the tips located at the end of each of the second splines are spaced from the intersection of adjacent flanks of the first pin.

* * * * *

UNITED STATES PATENT AND TRADEMARK OFFICE
CERTIFICATE OF CORRECTION

PATENT NO.        : 8,739,861 B2
APPLICATION NO.   : 13/178446
DATED             : June 3, 2014
INVENTOR(S)       : William James Hughes, Bryan Lane and Gary Marshall Briggs It is certified that error appears in the above-identified patent and that said Letters Patent is hereby corrected as shown below:

In the claims

Claim 24, column 18, lines 29-30: DELETE "extending outwardly from an exterior surface" and INSERT -- extending inwardly from an interior surface --.

Signed and Sealed this
Sixteenth Day of February, 2016

Michelle K. Lee
*Director of the United States Patent and Trademark Office*